(No Model.) 2 Sheets—Sheet 1.

E. HUBER & G. W. KING.
REVERSING GEAR FOR ENGINES.

No. 330,980. Patented Nov. 24, 1885.

(No Model.) 2 Sheets—Sheet 2.
E. HUBER & G. W. KING.
REVERSING GEAR FOR ENGINES.

No. 330,980. Patented Nov. 24, 1885.

WITNESSES
INVENTOR
Edward Huber
Geo. W. King.
By Leggett & Leggett
Attorney

United States Patent Office.

EDWARD HUBER AND GEORGE W. KING, OF MARION, OHIO.

REVERSING-GEAR FOR ENGINES.

SPECIFICATION forming part of Letters Patent No. 330,980, dated November 24, 1885.

Application filed June 18, 1885. Serial No. 169,082. (No model.)

*To all whom it may concern:*

Be it known that we, EDWARD HUBER and GEORGE W. KING, of Marion, in the county of Marion and State of Ohio, have invented certain new and useful Improvements in Valve Adjusting and Reversing Gear for Steam-Engines; and we do hereby declare the following to be a full, clear, and exact description of the invention, such as will enable others skilled in the art to which it appertains to make and use the same.

Our invention relates to an improvement in valve adjusting and reversing gear for steam-engines, the object being to provide valve-gear that shall be simple and durable in construction, adapted to be operated without any undue binding of the parts, and by a slight expenditure of power, and capable of varying the throw of the valve for varying the expansive effect of the steam on the piston, and also for readily reversing the engine.

With these ends in view our invention consists in certain features of construction and combinations of parts, as will be hereinafter described, and pointed out in the claims.

Figure 1:
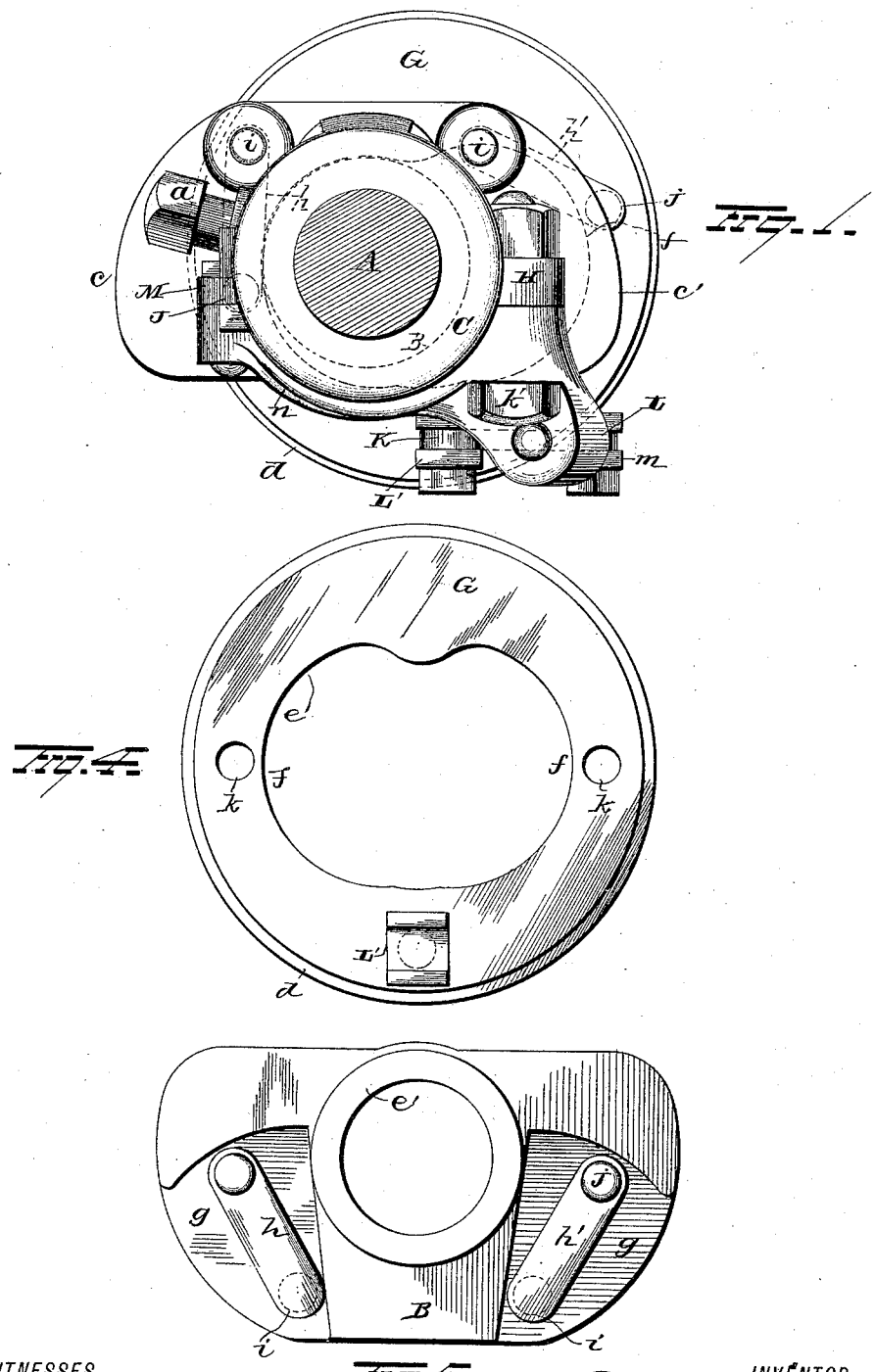
Figure 2:
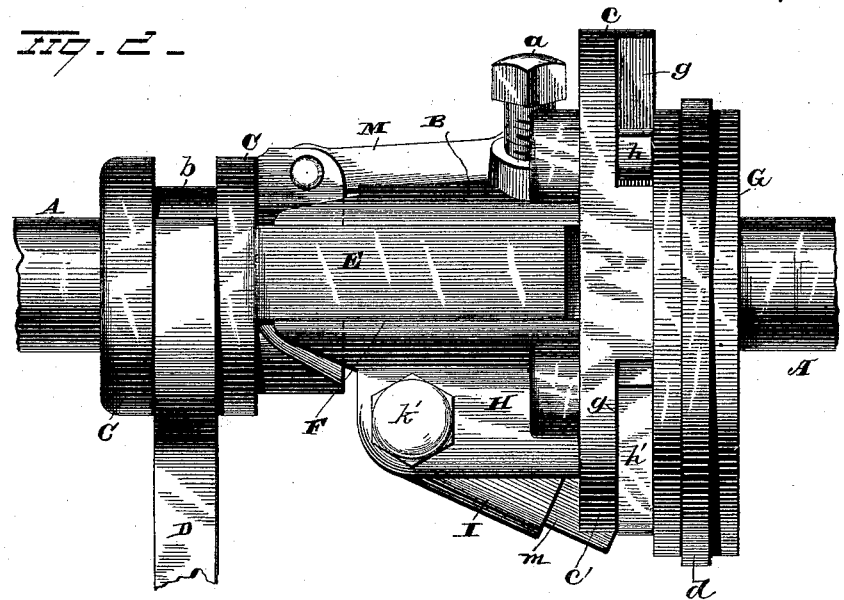
Figure 3:
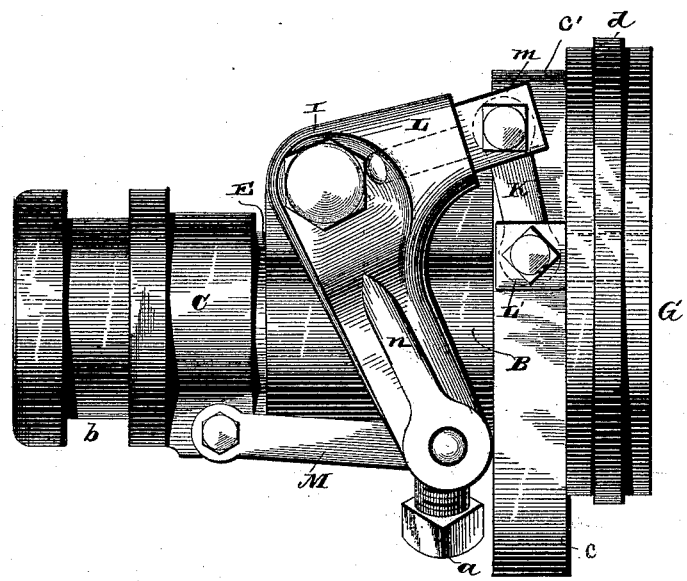

In the accompanying drawings, Figure 1 is an end view of our invention attached to an engine-shaft. Figs. 2 and 3 are views in elevation of the opposite sides of our improvement, Fig. 3 being detached from the shaft. Fig. 4 is an end view of the eccentric, and Fig. 5 is an end view of the fixed hub with the links pivoted thereto.

A represents the shaft of an engine, on which is placed the hub B, the latter being secured to the shaft in an adjustable and detachable manner by the set-screw $a$; or other devices may be used for this purpose. C is a collar fitting loosely upon the shaft, and formed with an annular groove, $b$, in which engage the bifurcated ends of a lever, D, for imparting an endwise sliding movement to the collar. A spline, E is secured to or cast integral with the collar C, and fits within a correspondingly-shaped groove, F, formed in the side of the hub B. Thus it will be observed that both the hub and collar are arranged to rotate with the shaft, while the collar is adapted to have an endwise movement imparted thereto. The hub B is constructed with lateral flanges or wings $c\ c'$, forming an enlarged bearing on one end thereof, against which is seated the eccentric G, the perimeter of which is formed with an annular flange, $d$, which fits within a corresponding groove in the eccentric-strap. (Not shown.) Eccentric G is formed with an elongated opening, $e$, into which extends the sleeve $e'$, which projects from one end of the hub. This opening is formed at each end in an arc of a circle, as represented at $f\ f$, so that the eccentric may have an extended bearing on the sleeve $e'$ when the eccentric is moved to its full limit of adjustment in either direction. The lateral flanges $c\ c'$ are each formed with a recess, $g$, in their outer faces, within which are placed the rocking links $h\ h'$. Each link is provided at one end with an arm, $i$, which is journaled in the flange of the hub, and its opposite end with an arm, $j$, which is journaled in a hole, $k$, formed in the eccentric, the holes $j\ j$ in the eccentric being located diametrically opposite each other. The eccentric is thus supported by the rocking or swing links, and is thereby enabled to be moved laterally with respect to the engine-shaft by a very slight expenditure of power.

Hub B is constructed with a projection, H, to which is pivoted by a bolt, $k'$, the bell-crank lever I. The short arm L of the bell-crank has applied thereto a swiveled bolt or stud, $m$, to which is pivoted one end of a link, K, the opposite end of which is pivoted to a swiveled stud, L', attached to the eccentric. To the long arm $n$ of the bell-crank is pivoted one end of a link, M, the opposite end of which is pivoted to the collar C. By imparting an endwise movement to the collar through the medium of the lever D or other suitable means, the bell-crank lever is rotated on its bearing and the eccentric moved toward or away from the center of the engine-shaft, and owing to the fact that the eccentric is supported in swinging links it offers very slight resistance in its different adjustments.

The eccentric may be adjusted so as to close the valve-ports, or to open them to any desired extent, or to reverse the valves so as to reverse the motion of the engine.

As it is evident that slight changes in the construction and relative arrangement of the different parts of our improvement might be made without departing from the spirit of our invention, we would have it understood that we do not restrict ourselves to the particular construction and arrangement of parts shown and described; but, Having fully described our invention, what we claim as new, and desire to secure by Letters Patent, is—

1. The combination, with a hub provided with recessed flanges and an eccentric engaging against the outer face of said flanges, of swinging links located in said recesses and pivotally connecting the opposite sides of the eccentric to said flanges, substantially as set forth.

2. The combination, with an eccentric supported on swinging links, of a movable collar and devices disconnected from the links and connecting the collar and eccentric for moving the latter toward and away from the center of the shaft, substantially as set forth.

3. The combination, with an eccentric having an elongated opening therein, and a hub provided with a cylindrical sleeve that extends into said opening, of swinging links for connecting the eccentric to the hub, substantially as set forth.

4. The combination, with a hub and collar connected by groove and spline, of an eccentric and bell-crank lever and connections for adjusting the position of the eccentric by imparting an endwise movement to the collar, substantially as set forth.

5. The combination, with a hub and an eccentric connected therewith by swinging links, of a collar connected to the hub by spline and groove, and devices connecting the collar and eccentric for adjusting the position of the latter, substantially as set forth.

In testimony whereof we have signed this specification in the presence of two subscribing witnesses.

EDWARD HUBER.
GEORGE W. KING.

Witnesses:
J. E. DAVIDS,
JENNIE M. DAVIDS.